US009990164B2

(12) United States Patent
Lee et al.

(10) Patent No.: US 9,990,164 B2
(45) Date of Patent: Jun. 5, 2018

(54) PRINTING METHOD OF IMAGE FORMING APPARATUS AND THE IMAGE FORMING APPARATUS

(71) Applicant: S-PRINTING SOLUTION CO., LTD., Suwon-si, Gyeonggi-Do (KR)

(72) Inventors: Hyun-suk Lee, Suwon-si (KR); Hee-jung Kim, Seoul (KR); Ju-won Min, Suwon-si (KR); In-ho Lee, Yongin-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days. days.

(21) Appl. No.: 15/259,574

(22) Filed: Sep. 8, 2016

(65) Prior Publication Data

US 2017/0337016 A1 Nov. 23, 2017

(30) Foreign Application Priority Data

May 20, 2016 (KR) ........................ 10-2016-0062386

(51) Int. Cl.
*G06F 3/12* (2006.01)
*H04N 1/00* (2006.01)
*G06Q 20/14* (2012.01)

(52) U.S. Cl.
CPC .......... *G06F 3/1203* (2013.01); *G06F 3/1222* (2013.01); *G06F 3/1273* (2013.01); *G06Q 20/14* (2013.01); *H04N 1/00408* (2013.01); *H04N 2201/0094* (2013.01)

(58) Field of Classification Search
CPC .... G06F 3/1203; G06F 3/1222; G06F 3/1273; G06C 20/14; H04N 1/00408; H04N 2201/0094

USPC ........................................................ 358/1.14
See application file for complete search history.

(56) References Cited

U.S. PATENT DOCUMENTS

| 7,321,443 B2 * | 1/2008 | Berkema ............... G06F 3/1205 358/1.14 |
| 2001/0003190 A1 * | 6/2001 | Shindo ................... G06K 15/00 709/217 |
| 2004/0034545 A1 | 2/2004 | Suzuki et al. |
| 2007/0047006 A1 * | 3/2007 | Sakai .................... G06F 3/1207 358/400 |
| 2007/0076254 A1 * | 4/2007 | Reilly ................... G06F 3/1206 358/1.15 |

(Continued)

FOREIGN PATENT DOCUMENTS

| JP | 2003-196737 A | 7/2003 |
| KR | 10-1091520 B1 | 12/2011 |

*Primary Examiner* — Allen H Nguyen
(74) *Attorney, Agent, or Firm* — Jefferson IP Law, LLP

(57) ABSTRACT

A printing method of an image forming apparatus is provided. The printing method includes receiving, from one of an external apparatus and a server connected to the external apparatus, job information and first identification (ID) information related to printing of content, receiving, from a user, second ID information, transmitting accounting information based on the job information to a billing system, when the second ID information received from the user and the first ID information received from one of the external apparatus and the server correspond to each other, and printing the content based on the job information, when payment completion information regarding payment by the user is received from the billing system.

22 Claims, 17 Drawing Sheets

(56) References Cited

U.S. PATENT DOCUMENTS

| | | | |
|---|---|---|---|
| 2009/0144182 A1* | 6/2009 | Matsuda | G06Q 10/10 705/32 |
| 2010/0005038 A1* | 1/2010 | Nagarajan | G06Q 30/02 705/400 |
| 2010/0079785 A1* | 4/2010 | Emori | G06F 21/608 358/1.14 |
| 2010/0241541 A1* | 9/2010 | Ito | G06Q 30/04 705/34 |
| 2013/0030968 A1* | 1/2013 | Suzuki | G06Q 20/14 705/34 |
| 2014/0320883 A1* | 10/2014 | Ichida | G07F 17/26 358/1.14 |
| 2014/0355039 A1* | 12/2014 | Tsujimoto | G06F 3/1204 358/1.14 |
| 2016/0012655 A1* | 1/2016 | Hanson | G07C 9/00039 340/5.54 |
| 2016/0050340 A1* | 2/2016 | Rubio | H04L 41/5054 358/1.14 |

* cited by examiner

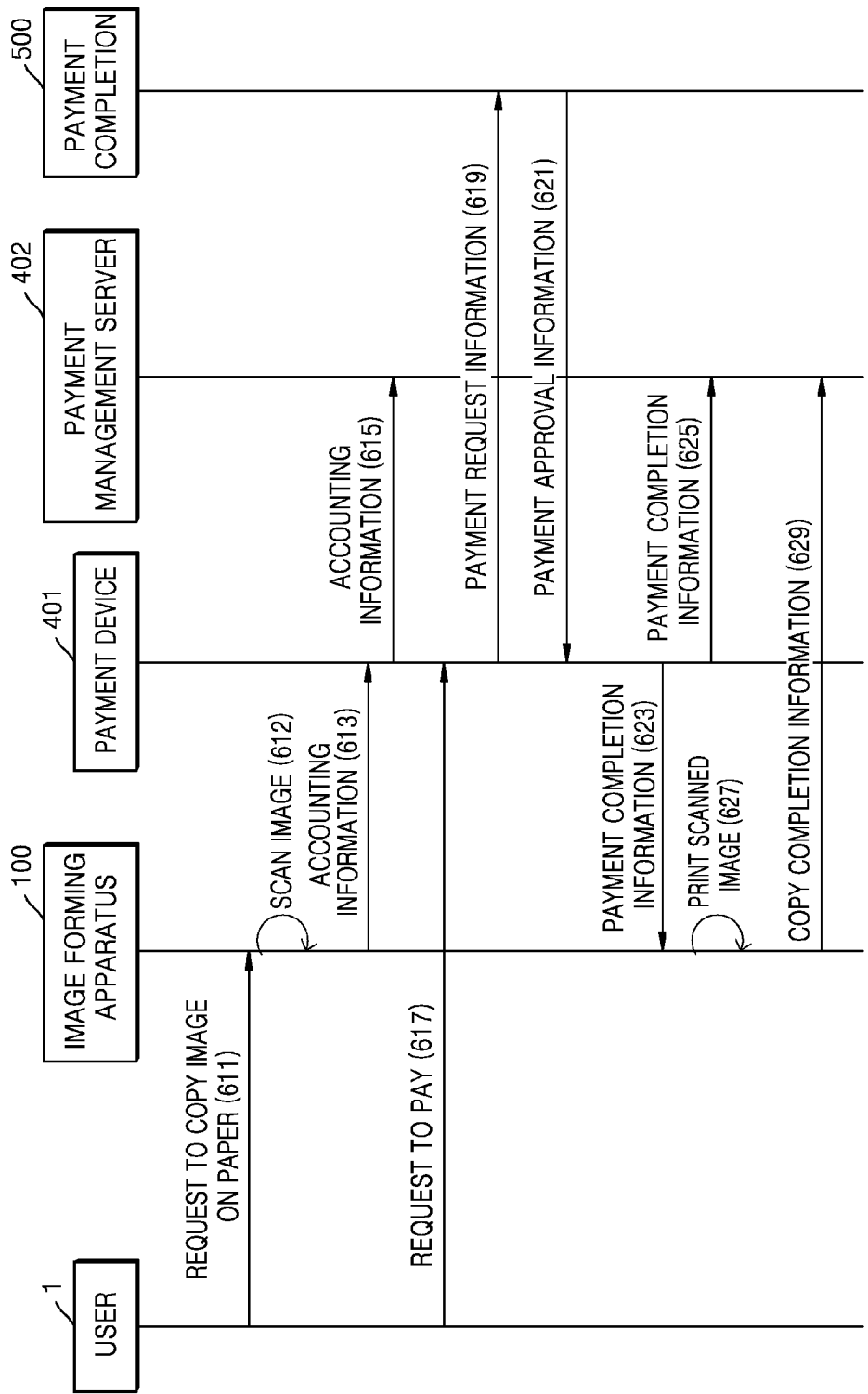

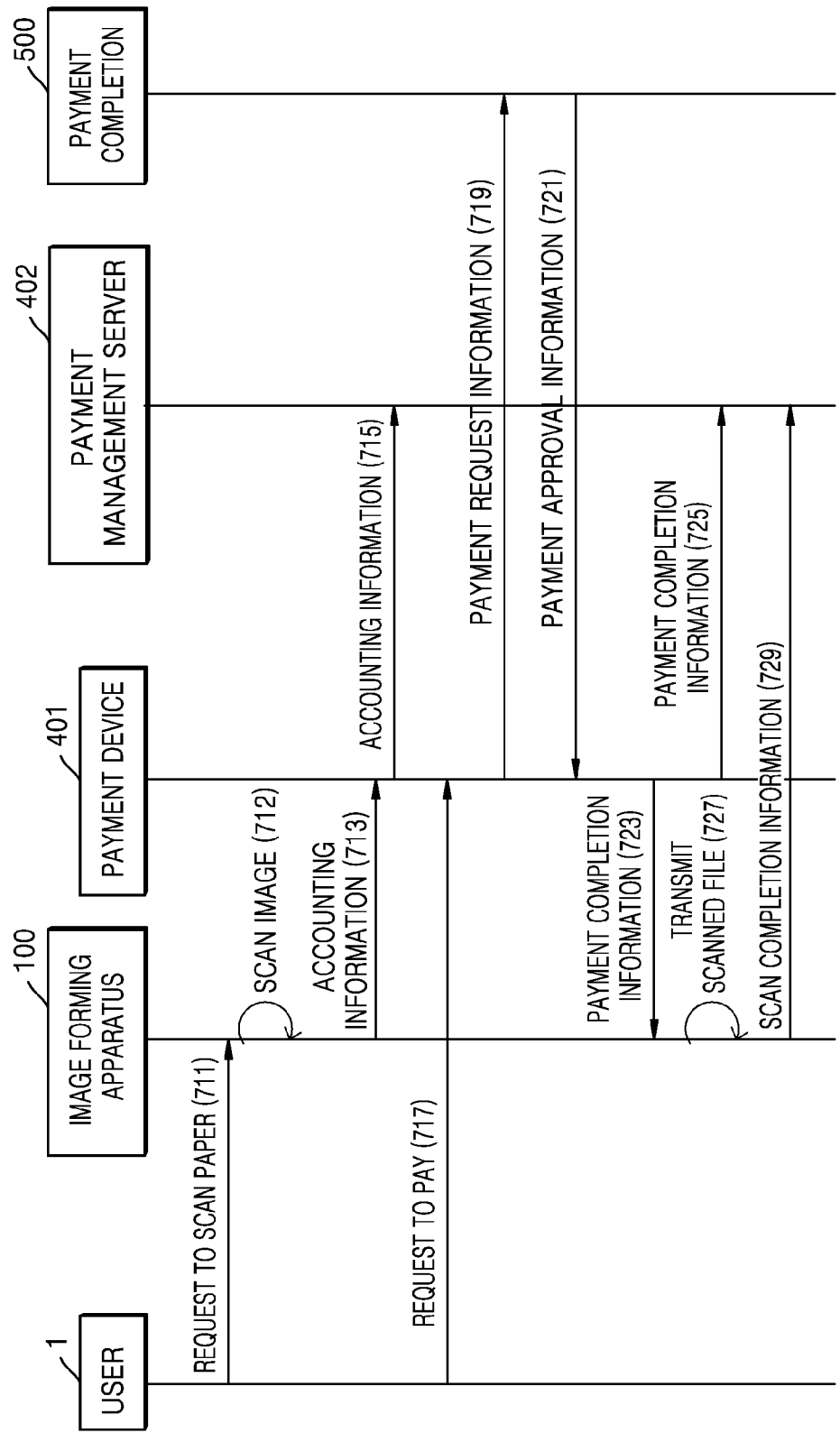

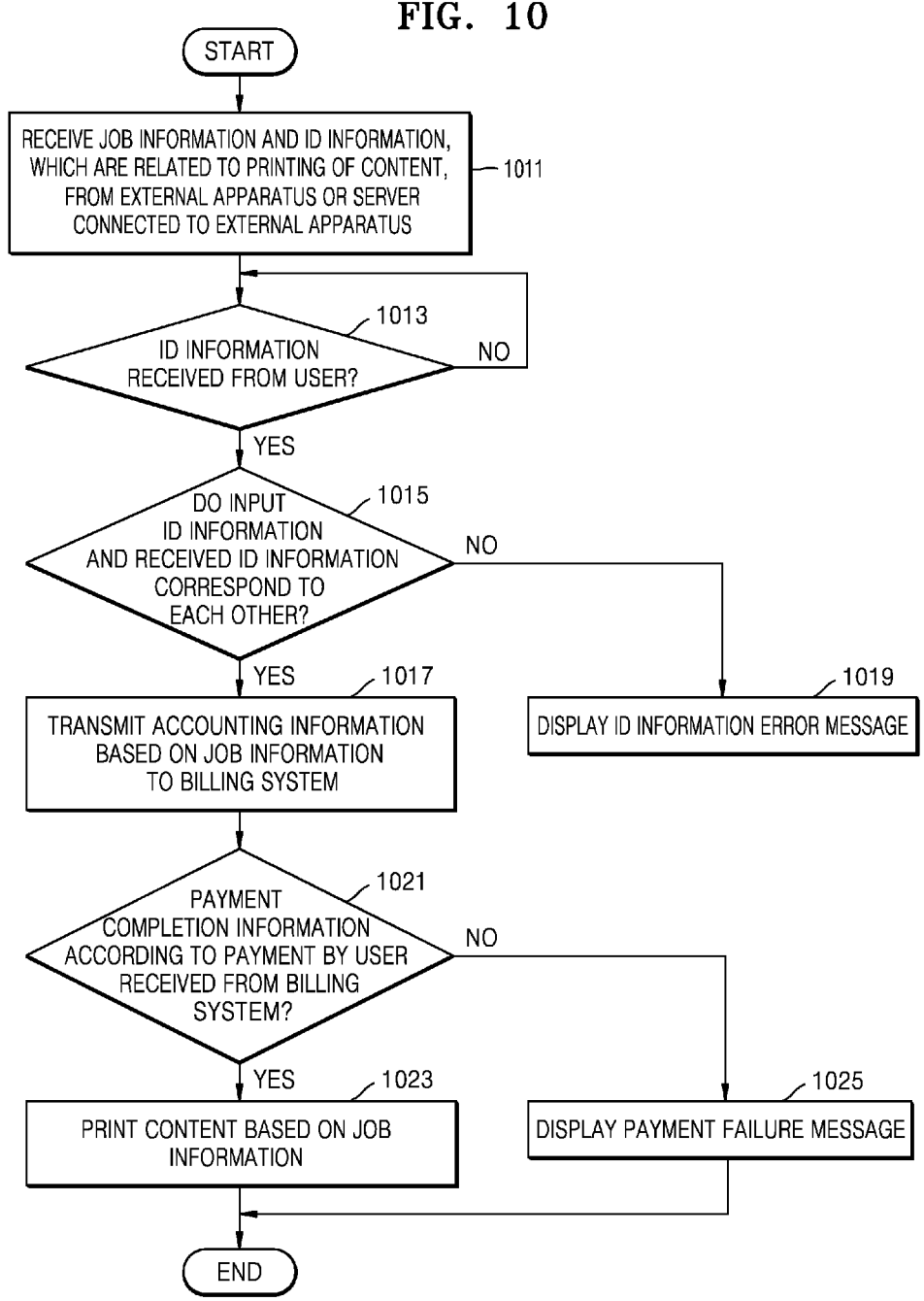

PRINTING METHOD OF IMAGE FORMING APPARATUS AND THE IMAGE FORMING APPARATUS

CROSS-REFERENCE TO RELATED APPLICATION(S)

This application claims the benefit under 35 U.S.C. § 119(a) of Korean patent application filed on May 20, 2016 in the Korean Intellectual Property Office and assigned Serial number 10-2016-0062386, the entire disclosure of which is hereby incorporated by reference.

TECHNICAL FIELD

The present disclosure relates to a printing method of an image forming apparatus and an apparatus using the printing method. More particularly, the present disclosure relates to a printing method of an image forming apparatus according to payment by a user, and an apparatus using the printing method.

BACKGROUND

In an existing environment of paying to use an image forming apparatus, when a user transmits content to be printed from an external apparatus, such as a personal computer (PC), to an image forming apparatus, an employee providing a print service prints the content by using the image forming apparatus and provides a printout to the user after a charge according to print options (for example, the number of printouts and color or monochrome printing) is paid.

At this time, procedures between the user and the employee, from requesting the printing of the content to transmitting the printout to the user, are complicated. In addition, there may be reliability issues regarding calculating of the charge and it may be difficult to manage a print history.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a printing method of an image forming apparatus and the image forming apparatus, which provides an unmanned print service that does not require an employee when the image forming apparatus is used with a charge.

Another aspect of the present disclosure is to provide a printing method of an image forming apparatus and the image forming apparatus, for enabling a user to easily make payment by using a payment device, such as a card terminal, and manage and provide, to a user, a job history of the image forming apparatus by using a payment management server so as to increase reliability of a print service.

In accordance with an aspect of the present disclosure, a printing method of an image forming apparatus is provided. The printing method includes receiving, from one of an external apparatus and a server connected to the external apparatus, job information and first identification (ID) information related to printing of content, receiving, from a user, second ID information, transmitting accounting information based on the job information to a billing system, when the second ID information received from the user and the first ID information received from one of the external apparatus and the server correspond to each other, and printing the content based on the job information, when payment completion information regarding payment by the user is received from the billing system.

In accordance with another aspect of the present disclosure, an image forming apparatus is provided. The imaging forming apparatus includes a communicator configured to receive, from one of an external apparatus and a server connected to the external apparatus, job information and first identification (ID) information related to printing of content, an input unit configured to receive, from a user, second ID information, and at least one processor configured to control the communicator to transmit accounting information based on the job information to a billing system, when the second ID information received by the input unit and the first ID information received by the communicator correspond to each other, and control the image forming apparatus to print the content based on the job information, when payment completion information regarding payment by the user is received by the communicator from the billing system.

In accordance with another aspect of the present disclosure, a non-transitory computer-readable recording medium is provided that has recorded thereon a program of instructions configured to be readable by at least one processor, which, when executed by the at least one processor of a computer, performs a printing method. The printing method includes receiving, from one of an external apparatus and a server connected to the external apparatus, job information and first identification (ID) information related to printing of content, transmitting accounting information based on the job information to a billing system, when second ID information received from a user and the first ID information received from one of the external apparatus and the server correspond to each other, and printing the content based on the job information, when payment completion information regarding payment by the user is received from the billing system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF TUE DRAWINGS

The above and other aspects, features, and advantages of certain embodiments of the present disclosure will be more apparent from the following description taken in conjunction with the accompanying drawings, in which:

FIG. 6 is a flowchart of a system for copying content, according to an embodiment of the present disclosure;

FIG. 7 is a flowchart of a system for scanning content, according to an embodiment of the present disclosure;

FIG. 10 is a flowchart of a method of printing content, according to an embodiments of the present disclosure.

Throughout the drawings, it should be noted that like reference numbers are used to depict the same or similar elements, features, and structures.

DETAILED DESCRIPTION

Figure 1:
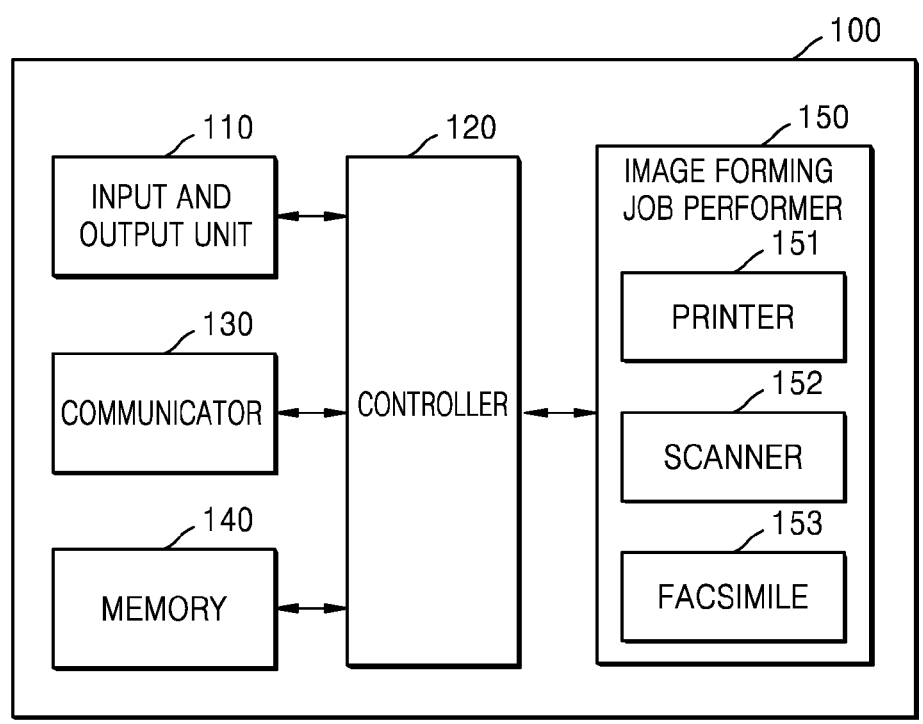
FIG. 1 is a block diagram of an image forming apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well known functions and constructions may be omitted for clarity and conciseness.

Expressions such as "at least one of," when preceding a list of elements, modify the entire list of elements and do not modify the individual elements of the list.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the specification, when an element is "connected" to another element, the elements may not only be "directly connected," but may also be "electrically connected" via another element therebetween. Also, when a region "includes" an element, the region may further include another element instead of excluding the other element, unless otherwise differently stated.

In the specification, an "image forming job" may denote any one of various jobs (for example, printing, copying, scanning, and faxing) related to an image, such as forming an image or generating/storing/transmitting an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), and a display apparatus.

Also, "content" may denote any type of data that is a target of an image forming job, such as a picture, an image, and a document file.

Also, "print data" may denote data having a format printable by a printer. In this case, "content" may include content having a format printable by a printer. For example, printing content may denote that content having a print data format is printed.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires.

FIG. 1 is a block diagram of an image forming apparatus 100 according to an embodiment of the present disclosure.

Referring to FIG. 1, the image forming apparatus 100 according to an embodiment may include an input and output unit 110, a controller 120, a communicator 130, a memory 140, and an image forming job performer 150. Also, although not illustrated in FIG. 1, the image forming apparatus 100 may further include a power supplier for supplying power to each component of the image forming apparatus 100. Also, the image forming apparatus 100 may be an apparatus on which an eXtensible Open Architecture (XOA), i.e., an open platform, is mounted.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

In detail, the input unit may include at least one of devices for receiving various types of user inputs, such as a keyboard, a physical button, a touch screen, a camera, and a microphone. Also, the output unit may include, for example, a display panel or a speaker. However, an embodiment is not limited thereto, and the input and output unit 110 may include at least one device supporting various inputs and outputs.

Also, the input and output unit 110 may include an independent control system. In other words, separately from the controller 120 of the image forming apparatus 100, the input and output unit 110 may include a control system (a controller and a memory) for controlling a user interface (UI) provided by the input and output unit 110. An operating system for providing a UI and programs, such as an application for supporting various functions, may be installed in the control system of the input and output unit 110.

The controller 120 controls overall operations of the image forming apparatus 100, and may include at least one processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, and store a new file in the memory 140.

Also, when job information and identification (ID) information related to printing of content are received from an external apparatus or a server connected to the external apparatus through the communicator 130, ID information is received from the user through the input unit of the input and output unit 110, and the ID information received from the user and the ID information received from the external apparatus or the server correspond to each other, the controller 120 may control the communicator 130 to transmit accounting information based on the job information to a billing system. Also, when payment completion information according to payment by the user is received through the communicator 130, the controller 120 may print the content based on the job information.

At this time, it is determined that the ID information received from the user and the ID information received from the external apparatus or the server correspond to each other when the ID information received from the user and the ID information received from the external apparatus or the server match each other.

Also, the controller 120 may control the communicator 130 to transmit content print completion information according to completion of the printing of the content to the billing system.

Also, when the ID information received from the user and the ID information received from the external apparatus or the server correspond to each other, the controller 120 may control the output unit of the input and output unit 110 to display a job information list including the job information, and when the job information is selected from the job information list, the controller 120 may control the communicator 130 to transmit the accounting information to the billing system.

The communicator 130 may communicate with another device or a network in a wired or wireless manner. Accordingly, the communicator 130 may include a communication module supporting at least one of various wired and wireless communication methods. For example, the communication module may be in a form of a chipset or may be a sticker or a barcode (for example, a sticker including a near field communication (NFC) tag) including information required for communication.

Wireless communication may include, for example, at least one of Wi-Fi, Wi-Fi direct, Bluetooth (BT), ultra wideband (UWB), and NFC. Wired communication may include, for example, at least one of universal serial bus (USB) and high definition multimedia interface (HDMI).

The communicator 130 may be connected to an external apparatus 200 provided outside the image forming apparatus 100 to transmit and receive a signal or data to and from the external apparatus 200.

Figure 2:
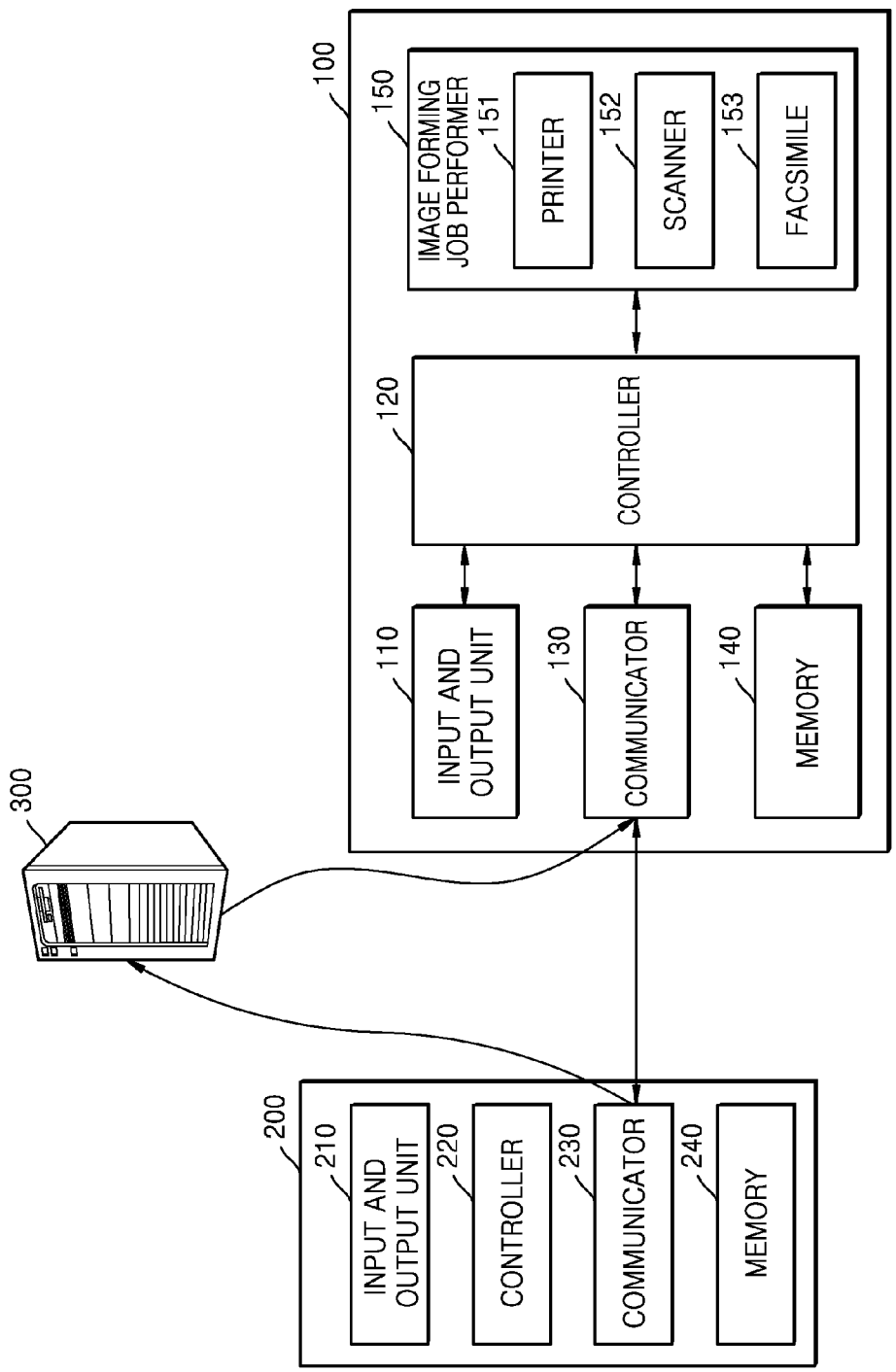
FIGS. 2 and 3 are diagrams for describing a system environment according to various embodiments of the present disclosure.

FIG. 2 is a diagram for describing a system environment according to various embodiments of the present disclosure.

Referring to FIG. 2, the image forming apparatus 100 is connected to the external apparatus 200 through the communicator 130. The communicator 130 may transmit a signal or data received from the external apparatus 200 to the controller 120, or transmit a signal or data generated by the controller 120 to the external apparatus 200. For example, when the communicator 130 receives a print command signal or print data from the external apparatus 200, the controller 120 may output the print data through a printer 151.

As shown in FIG. 2, the external apparatus 200 may include an input and output unit 210, a controller 220, a communicator 230, and a memory 240. The controller 220 may control an image forming job by executing a program stored in the memory 240 and transmitting a signal or data generated as a result of executing the program to the image forming apparatus 100 through the communicator 230. The external apparatus 200 may be, for example, at least one of a smart phone, a tablet personal computer (PC), a PC, an electronic device, a medical device, a camera, and a wearable device.

Meanwhile, the communicator 130 may be directly connected to a server 300 so as to transmit and receive a signal or data to and from the server 300. Also, the communicator 130 may be connected to the external apparatus 200 through the server 300. In other words, the communicator 130 of the image forming apparatus 100 may transmit and receive a signal or data to and from the communicator 230 of the external apparatus 200 through the server 300.

Referring back to FIG. 1, the various types of data, such as a file or a program like an application, may be installed and stored in the memory 140. The controller 120 may access the data stored in the memory 140 to use the data, or may store new data in the memory 140. Also, the controller 120 may execute the program installed in the memory 140. Also, the controller 120 may install an application received from an external source through the communicator 130 in the memory 140.

The image forming job performer 150 may perform an image forming job, such as printing, scanning, and faxing.

Referring to FIG. 1, the image forming job performer 150 includes the printer 151, a scanner 152, and a facsimile 153, but as occasion demands, the image forming job performer 150 may include some of them or may further include a component for performing another type of image forming job.

The printer 151 may form an image on a recording medium via any one of various printing methods, such as an electrophotography method, an inkjet method, a thermal transfer method, and a thermal method.

The scanner 152 may irradiate light onto paper and receive light reflected from the paper to read an image recorded on the paper.

The facsimile 153 may share a component for scanning an image with the scanner 152, share a component for printing a received file with the printer 151, transmit a scan file to a destination, and receive a rile from an external source.

Figure 3:
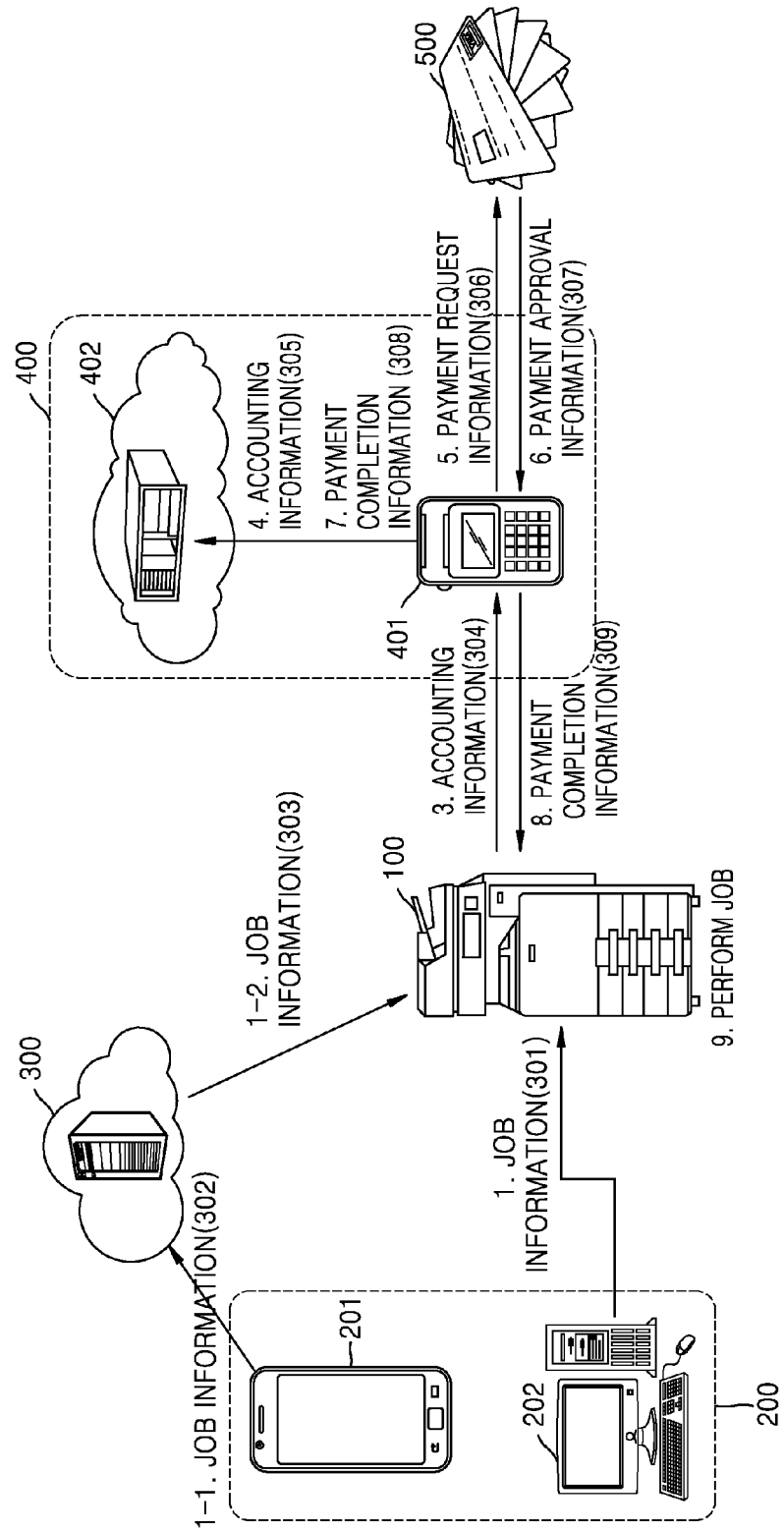

FIG. 3 is a diagram for describing a system environment according to an embodiment of the present disclosure.

Referring to FIG. 3, a system may include the image forming apparatus 100, the external apparatus 200, the server 300 (for example, a cloud server), a billing system 400, and a payment agency 500. The billing system 400 may include a payment device 401 for payment for job expenses using the image forming apparatus 100, and a payment management server 402 managing a job history of the image forming apparatus 100.

Here, the components of the system may be connected to each other through a communication network. For example, the image forming apparatus 100 may be connected to the external apparatus 200 and the server 300 via remote wireless communication, and may be connected to the payment device 401 via wireless local area communication or wired communication. The payment device 401 may be attached to the image forming apparatus 100 or may be provided near the image forming apparatus 100.

According to an embodiment, when a user requests, by using a PC 202 that is an example of the external apparatus 200, to print content, the PC 202 may transmit job information related to a job with respect to the content to the image forming apparatus 100, in operation 301.

The job with respect to the content may be a job related to printing, scanning, faxing, or copying of the content.

Also, the job information may include at least one of a job type, a job ID, the content, and a job option. The job type may be information about which one of a printing job, a scanning job, a faxing job, and a copying job is a job of the image forming apparatus 100. The job option (for example, a print option) may include at least one of a size of print paper, color or monochrome printing, double-sided printing, the number of printouts, the number of scanned papers, and the number of copies. The content may be content rendered to be in a print data format.

According to another embodiment, when the user requests a smart phone 201 that is another example of the external apparatus 200 to print the content, the smart phone 201 may transmit job information to the server 300, in operation 302. At this time, the user may request the smart phone 201 to print the content by using a job application (for example, a Samsung Cloud Print (SCP) application) installed in the smart phone 201. The server 300 renders the content to be printed to be in the print data format, and transmits the content in the print data format and the job information to the image forming apparatus 100, in operation 303.

When the user requests the content to be printed, the external apparatus 200 may receive ID information (for example, a personal identification number (PIN) or a password) from the user. Also, the external apparatus 200 may transmit the ID information to the image forming apparatus 100 together with the job information after adding the ID information to the job information.

The ID information may be generated in at least one of units of job information related to printing of content, units of content, and units of external apparatuses 200. When the ID information is generated in units of external apparatuses 200, for example, the ID information may be generated in at least one of units of types of the external apparatuses 200, ID information of the external apparatuses 200, and units of internet protocol (IP) addresses.

When the ID information is generated in units of job information, the user needs to input the ID information whenever the user requests printing. Also, when the ID information is generated in units of external apparatuses 200, once the ID information is input the first time the user requests the external apparatus 200 for printing, the user may not need to input the ID information again if the same external apparatus 200 is requested for printing later.

Meanwhile, when the ID information (for example, a phone number assigned to a smart phone) pre-exists in the external apparatus 200, the external apparatus 200 is able to transmit the ID information assigned together with the job information to the image forming apparatus 100 without a separate input of the user. Alternatively, when the ID information assigned together with the job information is transmitted to the server 300, the server 300 may transmit the ID information to the image forming apparatus 100.

As described in the above embodiments, when the job information and the ID information related to the printing of the content are transmitted to the image forming apparatus 100, the image forming apparatus 100 may receive the job information and the ID information.

Then, the user may move to the image forming apparatus 100 and input ID information through the input and output unit 110 of the image forming apparatus 100. The image forming apparatus 100 may determine whether the input ID information and the ID information received from the external apparatus 200 or the server 300 correspond to each other. For example, the image forming apparatus 100 may determine whether the input ID information and the received ID information match each other. Alternatively, when intrinsic information pre-registered in the image forming apparatus 100 exists, the image forming apparatus 100 may determine whether the input ID information matches information obtained by combining the received ID information and the intrinsic information.

When the ID information input from the user and the ID information received from the external apparatus 200 or the server 300 connected to the external apparatus 200 correspond to each other, the image forming apparatus 100 may transmit accounting information based on the job information of the content to the billing system 400.

The accounting information may include, for example, at least some of the job information and job expenses (for example, a printing cost). The at least some of the job information may be, for example, at least one of a job ID, a print option, and a job type.

The job expenses may be determined based on a job option. For example, the job expenses may be high when a size of print paper is large, color printing is set, or the number of printouts is high. Alternatively, the job expenses may be low when double-sided printing is set or a size of a print paper is small.

The billing system 400 may include at least one of the payment device 401 and a payment management server 402.

For example, the image forming apparatus 100 may transmit the accounting information to the payment device 401 (for example, a card terminal) of the billing system 400, in operation 304.

Upon receiving the accounting information, the payment device 401 may transmit the accounting information to the payment management server 402, in operation 305. In this case, registration result information indicating that the accounting information is registered may be received from the payment management server 402 that received the accounting information.

Meanwhile, the payment device 401 may display the job expenses included in the accounting information for printing the content. Upon checking the job expenses, the user may request to pay by using the payment device 401. For example, the user may pay for the job expenses by using a credit card, a debit card, a transportation card, a Cashbee card, a rechargeable card (for example, a T-money card), a Samsung Pay method, a Payon method, or a Coin method. When the user requests to pay, the payment device 401 may transmit payment request information to the payment agency 500, such as a value added network (VAN), in operation 306. The payment request information may include, for example, at least one of a card number, a payment amount, a transaction ID, and ID information of the payment device 401.

When the payment is approved based on the payment request information, the payment agency 500 may transmit payment approval information to the payment device 401, in operation 307. The payment approval information may include, for example, an approval number, an approval result, and an approval date.

The payment device 401 may transmit payment completion information according to the approval of the payment to the payment management server 402, in operation 308. The payment completion information may include at least one of a job ID, a transaction ID, job expenses, a card number, and a payment result. At this time, registration result information indicating that the payment completion information is registered may be received from the payment management server 402 that received the payment completion information.

Also, the payment device 401 may transmit the payment completion information according to the approval of the payment to the image forming apparatus 100, in operation 309.

Upon receiving the payment completion information, the image forming apparatus 100 may perform the job with respect to the content based on the job information received in operations 301 and 303.

Also, the image forming apparatus 100 may transmit job completion information according to completion of the job with respect to the content to the payment management server 402. The job completion information may include at least one of a job ID, a job option, and a job result. In this case, registration result information indicating that the job completion information is registered may be received from the payment management server 402 that received the job completion information.

Meanwhile, the payment management server 402 may manage a job history of the image forming apparatus 100 based on at least one of the accounting information, the payment completion information, and the job completion information.

For example, the content may not be printed even when the user has made the payment. In this case, the user may access the payment management server 402 (for example, access a service website or call a counselor) to request to print the content again. In this case, the payment management server 402 may determine a reason why the job with respect to the content was not performed based on the job history according to at least one of the accounting information, the payment completion information, and the job completion information, and provide feedback to the user.

According to various embodiments, the system of FIG. 3 may include a plurality of the image forming apparatuses 100. In this case, the job information transmitted to one of the image forming apparatuses 100 may be transmitted to another one of the image forming apparatuses 100. For example, when a workload according to the job information assigned to one image forming apparatus 100 is equal to or larger than a threshold value, the one image forming apparatus 100 may distribute the workload to another image forming apparatus 100 that has a low workload. Here, information about the image forming apparatus 100 that is to print the content requested by the user may be provided to the user. For example, ID information (for example, an ID, a product name, or a location) of the image forming apparatus 100 that is to print the content may be displayed through the external apparatus 200, through the image forming apparatus 100 being manipulated by the user, or through a separate guide display.

Figure 4:
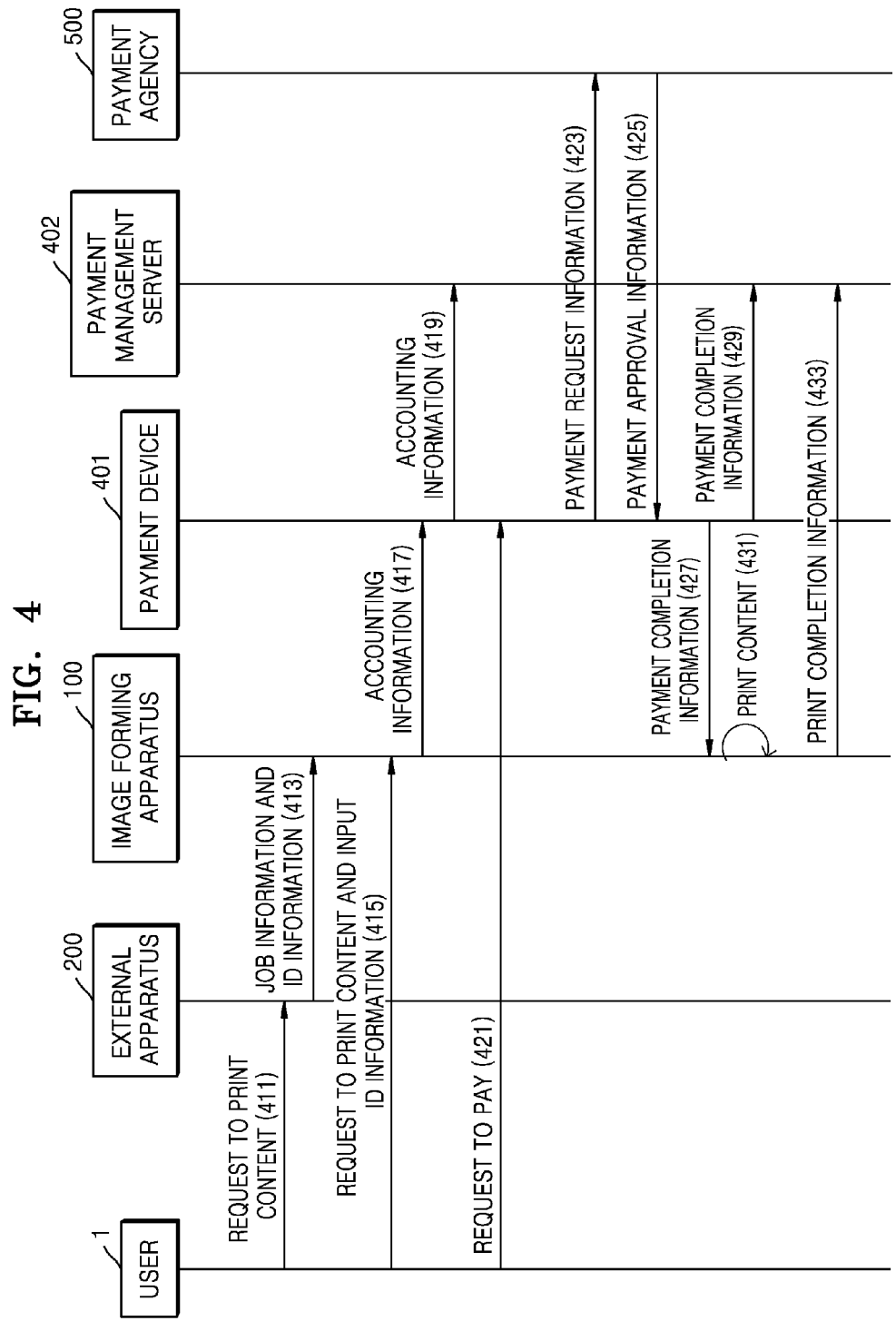
FIGS. 4 and 5 are flowcharts of a system for printing content, according to various embodiments of the present disclosure.

FIG. 4 is a flowchart of a system for printing content, according to an embodiment of the present disclosure.

Referring to FIG. 4, a user 1 may request, by using the external apparatus 200, for example, a PC, to print content, in operation 411.

Here, the user 1 may input ID information related to the printing of the content to the external apparatus 200. For example, when the user 1 requests to print the content, a popup screen requesting an input of the ID information is provided to the user, and when the user 1 inputs a character or a number through the popup screen, the external apparatus 200 may determine the input character or the input number as the ID information.

Then, the external apparatus 200 may transmit the input ID information and job information required to print the content to the image forming apparatus 100, in operation 413.

Then, the user 1 may move to the image forming apparatus 100, input ID information, and request the image forming apparatus 100 to print the content, in operation 415.

Here, the user 1 may input the ID information for printing the content. In this case, the ID information may be the same as the ID information input to the external apparatus 200 while requesting to print the content.

When the ID information input to the image forming apparatus in operation 415 and the ID information received from the external apparatus 200 in operation 413 correspond to each other, the image forming apparatus 100 may transmit accounting information based on the job information to the payment device 401, in operation 417.

Upon receiving the accounting information, the payment device 401 may transmit the accounting information to the payment management server 402, in operation 419. Alternatively, the image forming apparatus 100 may directly transmit the accounting information to the payment management server 402.

When the payment device 401 displays a printing cost included in the accounting information, the user 1 checks the printing cost and may request to pay by using a credit card or the like, in operation 421. Here, operation 419 may be performed after operation 421.

When the user requests to pay, the payment device 401 may transmit payment request information to the payment agency 500, in operation 423.

When the payment is approved based on the payment request information, the payment agency 500 may transmit payment approval information to the payment device 401, in operation 425. Upon receiving the payment approval information, the payment device 401 processes the payment and may transmit payment completion information to the image forming apparatus 100 and the payment management server 402, in operations 427 and 429, respectively.

Upon receiving the payment completion information, the image forming apparatus 100 may print the content based on the job information received in operation 413, in operation 431.

When the printing of the content is completed, the image forming apparatus 100 may transmit print completion information according to the completion of the printing of the content to the payment management server 402, in operation 433.

Figure 5:
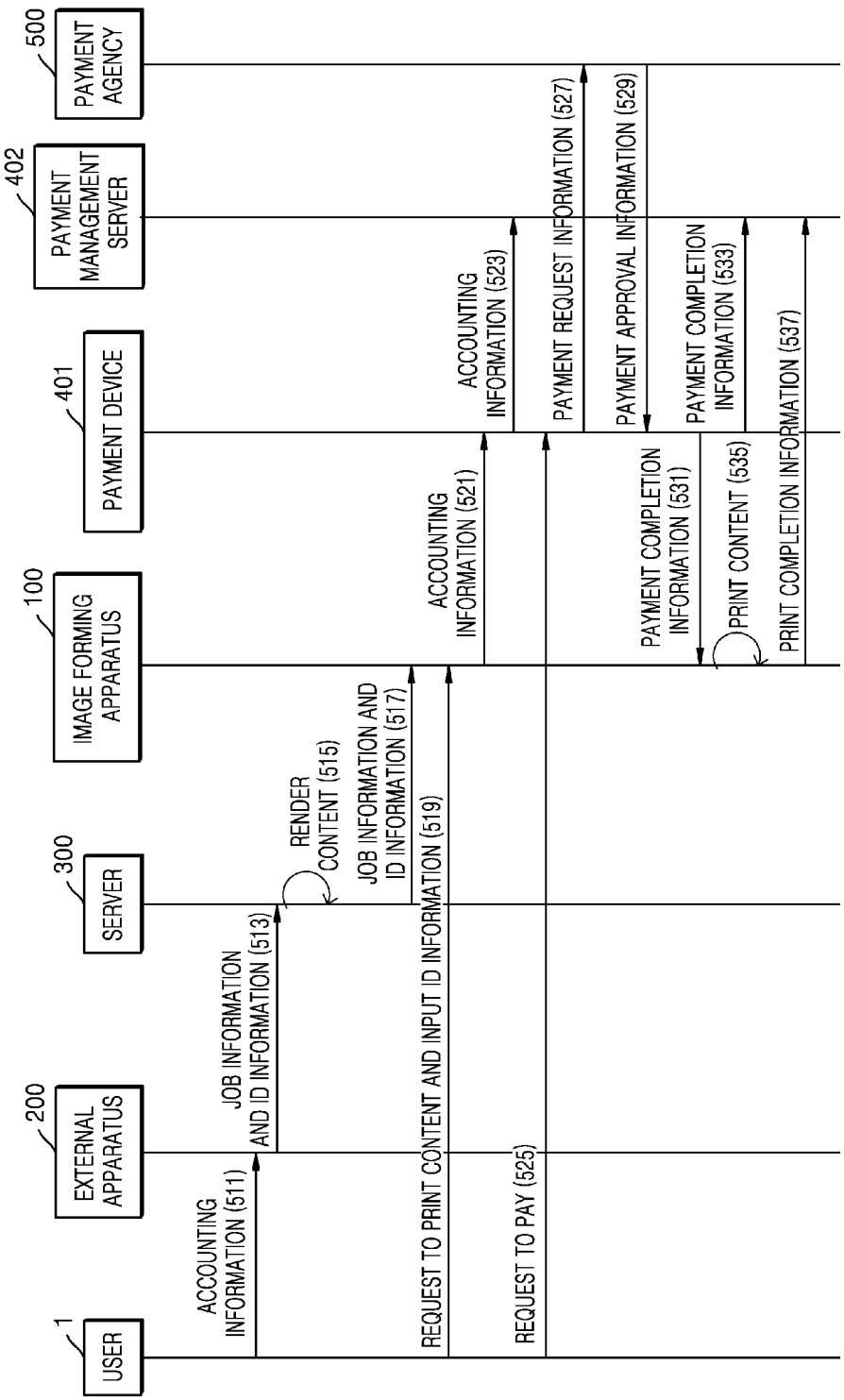

FIG. 5 is a flowchart of a system for printing content, according to an embodiment of the present disclosure.

Referring to FIG. 5, the user 1 may request, by using the external apparatus 200, for example, a smart phone, to print content, in operation 511.

The external apparatus 200 may transmit job information and ID information of the external apparatus 200, which are required to print the content, to the server 300, in operation 513. Here, the ID information of the external apparatus 200 may be a phone number assigned to the external apparatus 200.

The server 300 may render the content included in the job information to be in a print data format, in operation 515. Then, the server 300 may transmit the job information including the content in the print data format and the ID information to the image forming apparatus 100, in operation 517.

According to another embodiment, when the content is pre-stored in the server 300, the external apparatus 200 may transmit ID information of the content to be printed and the ID information of the external apparatus 200 to the server 300. In this case, the server 300 may transmit job information including the content in the print data format, which corresponds to the ID information of the content, and the ID information of the external apparatus 200 to the image forming apparatus 100, in operation 517.

Then, the user 1 may move to the image forming apparatus 100, input the ID information of the external apparatus 200 (for example, the phone number), and request to print the content, in operation 519.

When the ID information input to the image forming apparatus 100 in operation 519 and the ID information received from the server 300 in operation 517 correspond to each other, the image forming apparatus 100 may transmit accounting information based on the job information of the content to the payment device 401, and when payment completion information according to payment by the user 1 is received, the image forming apparatus 100 may print the content. Since operations 521, 523, 525, 527, 529, 531, 533, 535, and 537 correspond to operations 417, 419, 421, 423, 425, 427, 429, 431, and 433, respectively, of FIG. 4, details thereof will not be provided here again.

FIG. 6 is a flowchart of a system for copying content, according to an embodiment of the present disclosure.

Referring to FIG. 6, the user 1 may request to copy an image recorded on paper by using the external apparatus 200, in operation 611. According to a copy request of the user 1, the external apparatus 200 may scan the image recorded on the paper by irradiating light onto the paper, in operation 612.

Then, the external apparatus 200 may transmit accounting information based on job information for printing the scanned image to the payment device 401, and receive payment completion information according to completion of payment by the user 1. Since operations 613, 615, 617, 619, 621, 623, and 625 correspond to operations 417, 419, 421, 423, 425, 427, and 429, respectively, of FIG. 4, details thereof will not be provided here again.

Upon receiving the payment completion information, the image forming apparatus 100 may print the image scanned in operation 612 on a print medium, in operation 627.

Then, the image forming apparatus 100 may transmit copy completion information according to the printing of the scanned image to the payment management server 402, in operation 629.

FIG. 7 is a flowchart of a system for scanning content, according to an embodiment of the present disclosure.

Referring to FIG. 7, the user 1 may request to scan an image recorded on a paper by using the external apparatus 200, in operation 711. According to a scan request of the user 1, the image forming apparatus 100 may scan the image recorded on the paper by irradiating light onto the paper, in operation 712.

Then, the image forming apparatus 100 may transmit accounting information based on job information for printing the scanned image to the payment device 401, and receive payment completion information according to payment completion of the user 1. Since operations 713, 715, 717, 719, 721, 723, and 725 correspond to operations 417, 419, 421, 423, 425, 427, and 429, respectively, of FIG. 4, details thereof will not be provided here again.

Upon receiving the payment completion information, the image forming apparatus 100 may transmit a scanned file generated accordingly to a destination, in operation 727. Here, the destination may be, for example, one of a mobile disk mounted in the image forming apparatus 100, a cloud server, an email server corresponding to an email address separately input by the user 1, and an apparatus of a third person. Alternatively, the destination may be a user terminal connected to the image forming apparatus 100 via NFC.

Then, the image forming apparatus 100 may transmit scan completion information according to generation and transmission of the scanned file to the payment management server 402, in operation 729.

Meanwhile, when the image recorded on the paper is scanned, the user 1 may input a password required to execute the scanned file through the image forming apparatus 100. Here, the input password is transmitted to the destination together with the scanned file, and when the user 1 or the third person requests to execute the scanned file at the destination, the scanned file may be executed after the password is authenticated.

FIGS. 8A through 8E illustrate UIs used when printing content, according to various embodiments of the present disclosure.

Figure 8A:
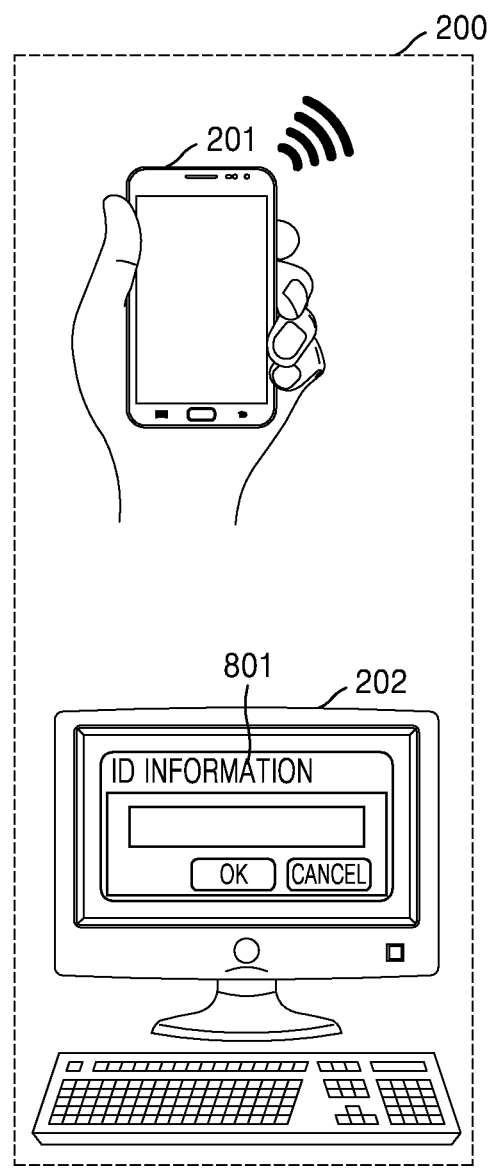
FIGS. 8A through 8E illustrate user interfaces (UIs) used when printing content, according to various embodiments of the present disclosure.

Referring to FIG. 8A, a user may request to print content by using the external apparatus 200. An example of the external apparatus 200 may be the smart phone 201 or the PC 202. Here, the external apparatus 200 may provide a popup screen 801 requesting an input of ID information. The user may input ID information through the popup screen 801. The external apparatus 200 may transmit job information and the input ID information, which are required to print the content, to the image forming apparatus 100.

Figure 8B:
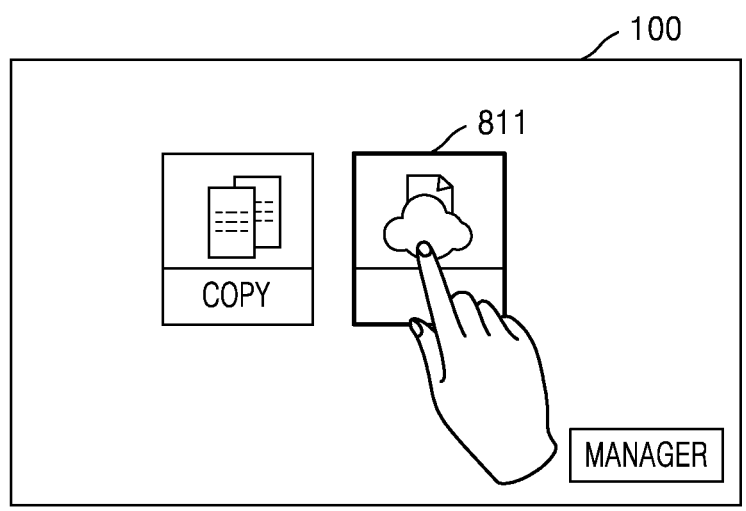

When the user moves to the image forming apparatus 100 and operates the image forming apparatus 100, the image forming apparatus 100 may provide a main screen as shown in FIG. 8B.

Figure 8C:
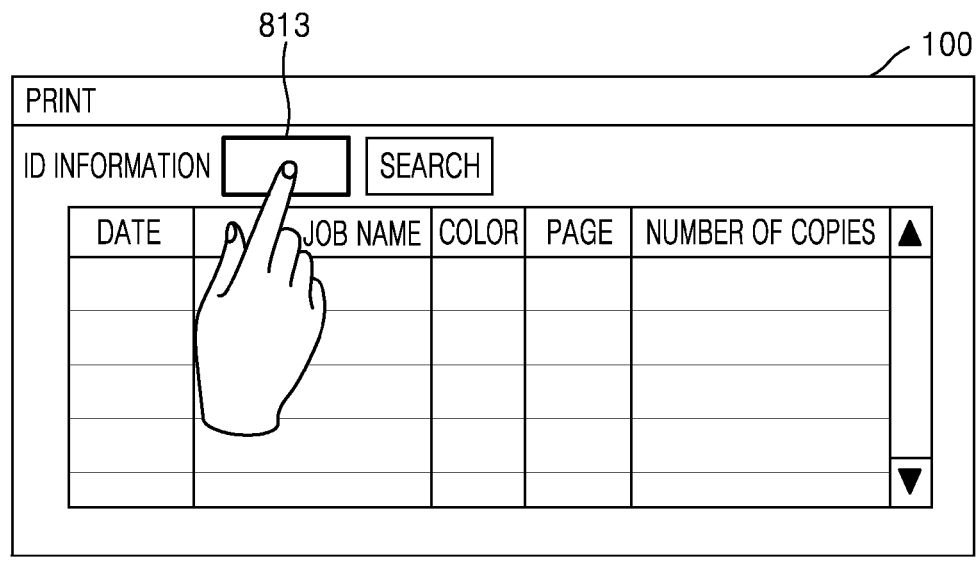

Then, upon receiving a user input of selecting a print job UI element 811, the image forming apparatus 100 may provide a screen including an ID information input field 813 as shown in FIG. 8C.

Figure 8D:
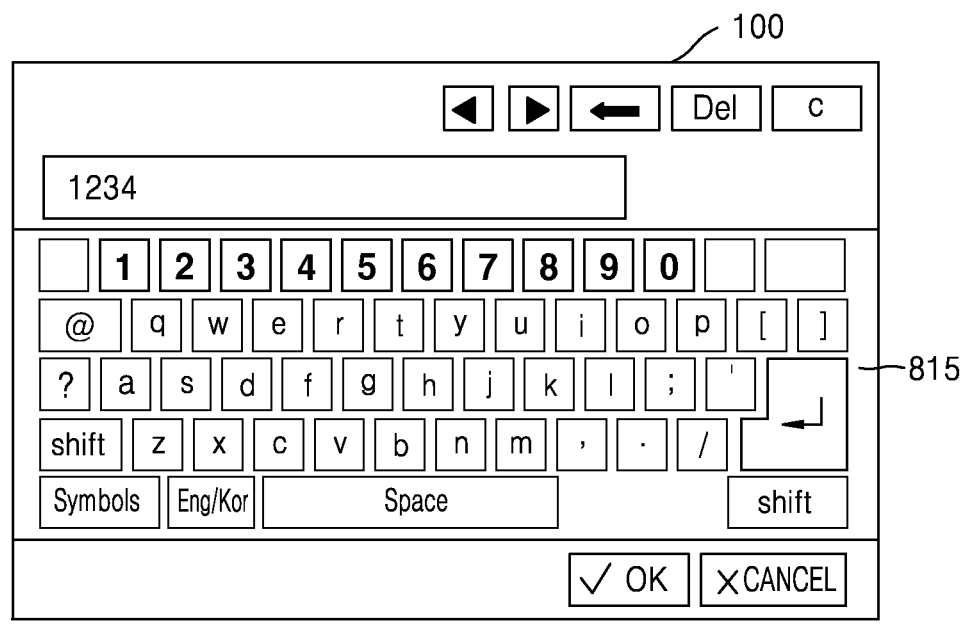

Then, upon receiving a user input of selecting the ID information input field 813, the image forming apparatus 100 may provide a screen including a virtual keypad 815 for inputting ID information as shown in FIG. 8D.

Figure 8E:
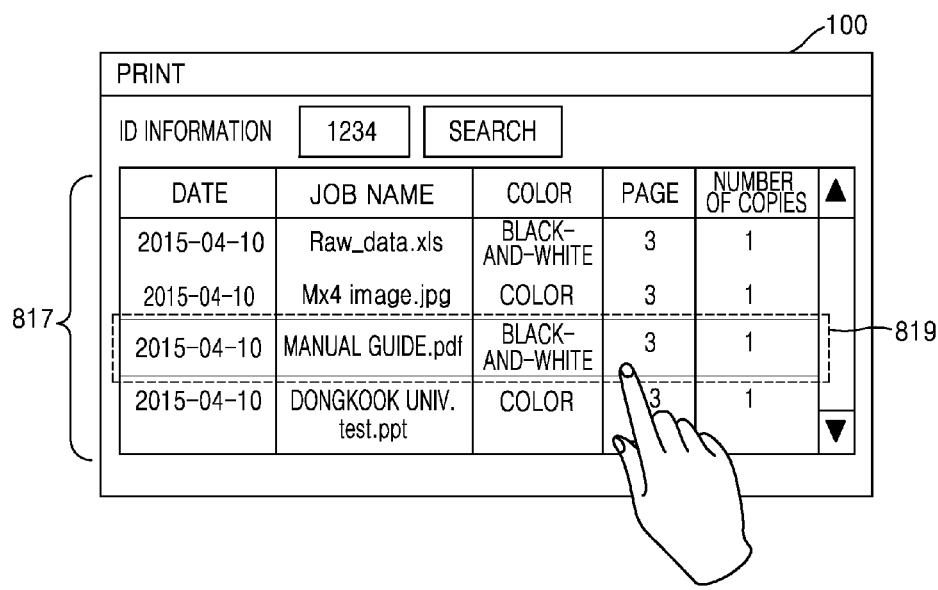

When the user inputs ID information by using the virtual keypad 815, the image forming apparatus 100 may provide a job information list 817 including ID information of at least one piece of job information requested by the user as shown in FIG. 8E. The ID information of the job information may include, for example, at least one of a name of content, a time when content is requested to be printed, and a print option with respect to content.

When the user selects ID information 819 of job information including content to be printed by referring to the job information list 817, the image forming apparatus 100 transmits accounting information for printing the content included in the job information based on the ID information 819 to the billing system 400, and when payment completion information according to payment by the user is received from the billing system 400, the image forming apparatus 100 may print the content based on the job information.

FIGS. 9A through 9D illustrate UIs used when copying content, according to various embodiments of the present disclosure.

Figure 9A:
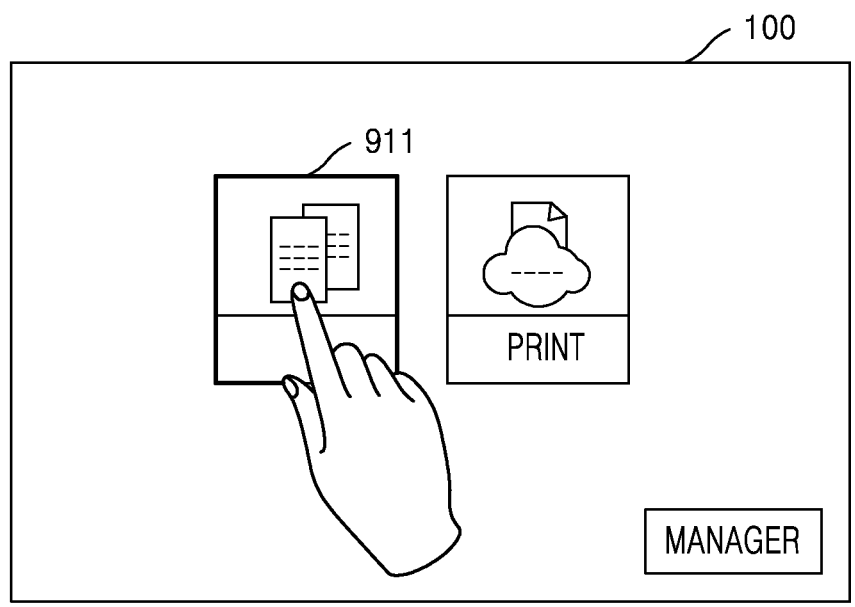
FIGS. 9A through 9D illustrate UIs used when copying content, according to various embodiments of the present disclosure.

Referring to FIG. 9A, the image forming apparatus 100 may provide a main screen.

Figure 9B:
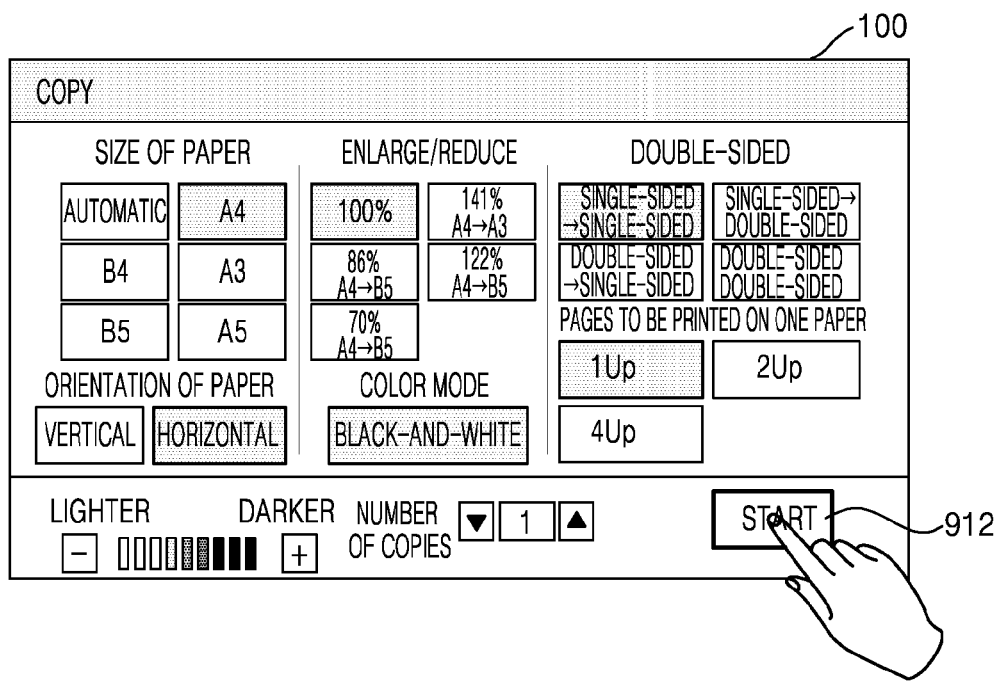

According to a user input of selecting a copy job UI element 911, the image forming apparatus 100 may provide a screen for selecting a copy option as shown in FIG. 9B.

Figure 9C:
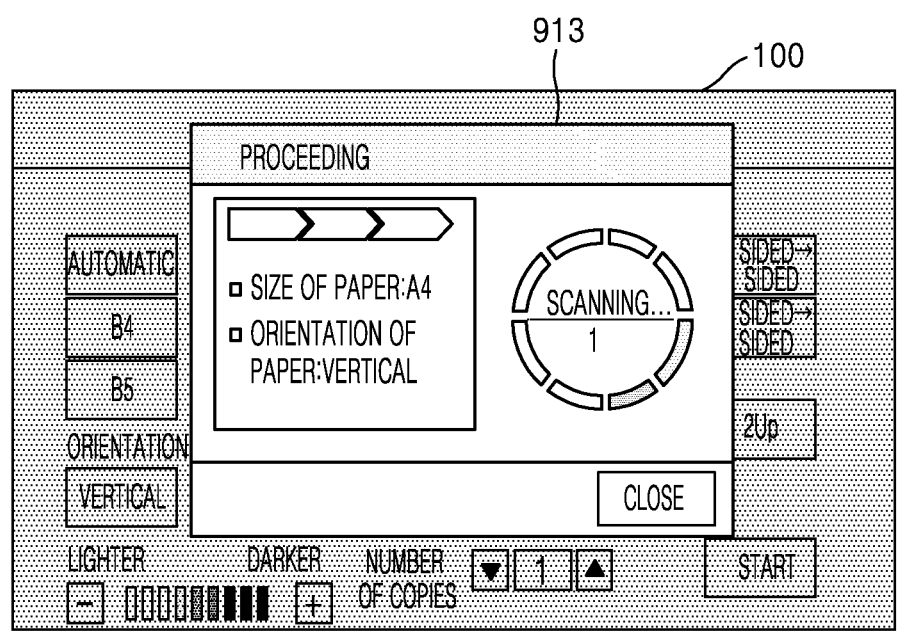

According to a user input of determining the copy option and selecting a copy start UI element 912, the image forming apparatus 100 may scan an image of paper in the image forming apparatus 100 while providing visual feedback 913 indicating that the image is being scanned as shown in FIG. 9C.

Figure 9D:
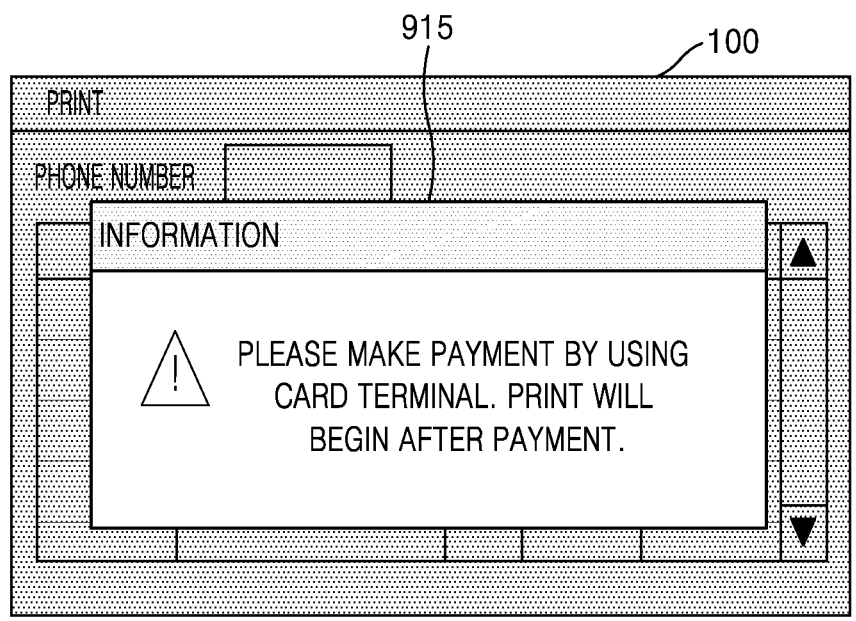

When the scanning of the image is completed, the image forming apparatus 100 may provide a guide message 915 requesting the user for payment as shown in FIG. 9D. For example, the guide message 915 may include information indicating that the scanned image is printable only after payment is made.

When the user makes the payment by using the payment device 401 based on the guide message 915 and the image forming apparatus 100 receives payment completion information from the billing system 400, the image forming apparatus 100 may print the scanned image according to the copy option set in FIG. 9B.

FIG. 10 is a flowchart of a method of printing content, according to an embodiment of the present disclosure.

In operation 1011, the image forming apparatus 100 may receive job information and ID information, which are related to printing of content, from the external apparatus 200 or the server 300 connected to the external apparatus 200. The ID information may be, for example, a password or a PIN. Alternatively, when the external apparatus 200 is a smart phone, the ID information may be a phone number assigned to the external apparatus 200. Also, the ID information may be generated in at least one of units of the job information, the content, and the external apparatus 200.

Then, the image forming apparatus 100 may determine whether ID information is input from a user, in operation 1013.

When it is determined that the ID information is input from the user, the image forming apparatus 100 may determine whether the input ID information and the ID information received in operation 1011 correspond to each other, in operation 1015. The input ID information and the received ID information may be determined to correspond to each other when the input ID information and the received ID information match each other.

When it is determined that the input ID information and the received ID information correspond to each other, the image forming apparatus 100 may transmit accounting information based on the job information received in operation 1011 to the billing system 400, in operation 1017. Here, the accounting information may include a printing cost for printing the content.

As another example, when it is determined that the input ID information and the received ID information correspond to each other, the image forming apparatus 100 may display a job information list including the job information received, in operation 1011. When the received job information is selected from the job information list, the image forming apparatus 100 may transmit the accounting information based on the job information to the billing system 400.

When it is determined that the input ID information and the received ID information do not correspond to each other, the image forming apparatus 100 may display an ID information error message, in operation 1019, to notify the user to input ID information again or that printing is not possible.

Then, the image forming apparatus 100 may determine whether payment completion information according to payment by the user is received from the billing system 400, in operation 1021.

Upon receiving the payment completion information, the image forming apparatus 100 may print the content based on the job information received in operation 1011, in operation 1023.

However, when payment failure information is received instead of the payment completion information, the image forming apparatus 100 may display a payment failure message, in operation 1025.

When the printing of the content is completed, the image forming apparatus 100 may transmit print completion information to the billing system 400.

The embodiments described above may be embodied as computer-readable codes on a non-transitory computer-readable recording medium storing commands and data executable by a computer. At least one of the commands and the data may be stored in a form of a program code, and may perform an operation by generating a program module when executed by a processor.

Examples of the non-transitory computer-readable recording medium include magnetic storage media (e.g., read only memory (ROM), floppy disks, hard disks, etc.), optical recording media (e.g., compact disk ROMs (CD-ROMs), or digital versatile disks (DVDs)), memories included in a server accessible through a network, etc. For example, the non-transitory computer-readable recording medium may be at least one of the memory 140 of the image forming apparatus 100 or a memory of the input and output unit 110 that is configured as an independent control system. Alternatively, the non-transitory computer-readable recording medium may be the memory 240 included in the external apparatus 200 connected to the image forming apparatus 100 through a network.

According to the embodiments of the present disclosure, a charged service for printing content may be easily provided to a user by using a payment device.

For example, when the user requests printing of content by using an external apparatus, the user may input ID information through the external apparatus or ID information pre-stored in the external apparatus may be transmitted to an image forming apparatus. In this case, the content is printed when ID information input to the image forming apparatus by the user and the pre-stored ID information correspond to each other, and thus security of printouts may be increased.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A printing method of an image forming apparatus, the printing method comprising:
   receiving, at the image forming apparatus from one of an external apparatus or a server connected to the external apparatus, job information, including content, and first identification (ID) information related to printing of the content;
   receiving, from a user, second ID information;
   transmitting accounting information based on the job information to a billing system, when the second ID information received from the user and the first ID information received from one of the external apparatus or the server correspond to each other; and
   printing the content based on the job information, when payment completion information regarding payment by the user is received from the billing system.

2. The printing method of claim 1, wherein the billing system comprises at least one of a payment device for payment for a printing cost of the content or a payment management server for managing a print history of the content.

3. The printing method of claim 1, wherein each of the first ID information and the second ID information comprises one of a password or a personal identification number (PIN).

4. The printing method of claim 1, wherein, when the external apparatus comprises a smart phone, the first ID information comprises a phone number assigned to the smart phone.

5. The printing method of claim 1, wherein it is determined that the second ID information received from the user and the first ID information received from one of the external apparatus or the server correspond to each other when the second ID information received from the user and the first ID information received from one of the external apparatus or the server match each other.

6. The printing method of claim 1, wherein the accounting information comprises a printing cost for the printing of the content.

7. The printing method of claim 1, wherein each of the first ID information and the second ID information is generated in units of at least one of job information, content, or external apparatuses.

8. The printing method of claim 1, further comprising transmitting print completion information regarding completion of the printing of the content to the billing system.

9. The printing method of claim 1, wherein, when the second ID information received from the user and the first ID information received from one of the external apparatus or the server correspond to each other, the transmitting of the accounting information comprises:
    displaying a job information list comprising the job information; and
    transmitting, when the job information is selected from the job information list, the accounting information based on the job information to the billing system.

10. The printing method of claim 1, wherein the job information comprises a job ID, the content in a print data format, and a print option.

11. An image forming apparatus comprising:
    a communicator to receive, at the image forming apparatus from one of an external apparatus or a server connected to the external apparatus, job information, including content, and first identification (ID) information related to printing of the content;
    an input device to receive, from a user, second ID information; and
    at least one processor to:
        control the communicator to transmit accounting information based on the job information to a billing system, when the second ID information received by the input device and the first ID information received by the communicator correspond to each other, and
        control the image forming apparatus to print the content based on the job information, when payment completion information regarding payment by the user is received by the communicator from the billing system.

12. The image forming apparatus of claim 11, wherein the billing system comprises at least one of a payment device for payment for a printing cost of the content or a payment management server for managing a print history of the content.

13. The image forming apparatus of claim 11, wherein each of the first ID information and the second ID information comprises one of a password or a personal identification number (PIN).

14. The image forming apparatus of claim 11, wherein, when the external apparatus comprises a smart phone, the first ID information comprises a phone number assigned to the smart phone.

15. The image forming apparatus of claim 11, wherein it is determined that the second ID information and the first ID information correspond to each other when the second ID information and the first ID match each other.

16. The image forming apparatus of claim 11, wherein the accounting information comprises a printing cost for the printing of the content.

17. The image forming apparatus of claim 11, wherein each of the first ID information and the second ID information is generated in at least one of units of job information, content, or external apparatuses.

18. The image forming apparatus of claim 11, wherein the at least one processor controls the communicator to transmit print completion information regarding completion of the printing of the content to the billing system.

19. The image forming apparatus of claim 11, further comprising:
    a display to display a screen,
    wherein the at least one processor:
        controls the display to, when the second ID information received by the input device and the first ID information received by the communicator correspond to each other, display a job information list comprising the job information, and
        controls the communicator to, when the job information is selected from the job information list, transmit the accounting information based on the job information to the billing system.

20. The image forming apparatus of claim 11, wherein, when the external apparatus comprises a smart phone, the user may request the smart phone to print the content by using a job application installed in the smart phone.

21. The image forming apparatus of claim 11, wherein, when the communicator receives the job information and the first ID information from an external apparatus and the first ID information is pre-stored in the external apparatus, the content is printed by the image forming apparatus when the second ID information and the pre-stored first ID information correspond to each other.

22. A non-transitory computer-readable recording medium having recorded thereon a program of instructions readable by at least one processor, the non-transitory computer-readable recording medium comprising:
    instructions to receive, at an image forming apparatus from one of an external apparatus or a server connected to the external apparatus, job information, including content, and first identification (ID) information related to printing of the content;
    instructions to transmit accounting information based on the job information to a billing system, when second ID information received from a user and the first ID information received from one of the external apparatus or the server correspond to each other; and
    instructions to print the content based on the job information, when payment completion information regarding payment by the user is received from the billing system.

* * * * *

UNITED STATES PATENT AND TRADEMARK OFFICE
CERTIFICATE OF CORRECTION

PATENT NO. : 9,990,164 B2
APPLICATION NO. : 15/259574
DATED : June 5, 2018
INVENTOR(S) : Hyun-suk Lee et al.

It is certified that error appears in the above-identified patent and that said Letters Patent is hereby corrected as shown below:

In the Claims

In Column 16, Line 12 approx., Claim 15, after "ID" insert -- information --.

Signed and Sealed this
Thirteenth Day of November, 2018

Andrei Iancu
*Director of the United States Patent and Trademark Office*